(12) United States Patent
Clark et al.

(10) Patent No.: US 11,222,060 B2
(45) Date of Patent: Jan. 11, 2022

(54) VOICE ASSISTANTS WITH GRAPHICAL IMAGE RESPONSES

(71) Applicant: HEWLETT-PACKARD DEVELOPMENT COMPANY, L.P., Houston, TX (US)

(72) Inventors: Alexander Wayne Clark, Houston, TX (US); Kent E. Biggs, Houston, TX (US); Henry Wang, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 707 days.

(21) Appl. No.: 16/076,235

(22) PCT Filed: Jun. 16, 2017

(86) PCT No.: PCT/US2017/037884
§ 371 (c)(1),
(2) Date: Aug. 7, 2018

(87) PCT Pub. No.: WO2018/231247
PCT Pub. Date: Dec. 20, 2018

(65) Prior Publication Data
US 2021/0182330 A1    Jun. 17, 2021

(51) Int. Cl.
*G06F 16/432* (2019.01)
*G06F 21/32* (2013.01)
(Continued)

(52) U.S. Cl.
CPC ............ *G06F 16/433* (2019.01); *G06F 21/32* (2013.01); *G10L 15/22* (2013.01); *G10L 15/28* (2013.01); *G10L 17/04* (2013.01)

(58) Field of Classification Search
CPC ......... G10L 15/22; G10L 15/28; G10L 17/04; G06F 16/433; G06F 21/32
See application file for complete search history.

(56) References Cited

U.S. PATENT DOCUMENTS 7,415,100 B2    8/2008  Cooper et al.
7,971,057 B2    6/2011  Grobman et al.
(Continued)

FOREIGN PATENT DOCUMENTS

EP    2927903 A1    10/2015

OTHER PUBLICATIONS

Moorthy et al., "Privacy Concerns for Use of Voice Activated Personal Assistant in the Public Space", International Journal of Human-Computer Interaction, Retrieved from Internet: http://www.tandfonline.com/doi/full/10.1080/10447318.2014.986642, 2014, 106 Pages.

*Primary Examiner* — Michael Colucci
(74) *Attorney, Agent, or Firm* — Tong Rea Bentley & Kim

(57) ABSTRACT

In an example, an apparatus having a voice assistant application that generates a graphical image response is provided. The apparatus includes a microphone and a processor in communication with the microphone. The microphone receives a secure voice assistant mode activation command and a voice command. The processor is to execute a voice assistant application, wherein the voice assistant application is to generate a graphical image response in response to the secure voice assistant mode activation command and the voice command, to change a privacy setting in the apparatus in response to the secure voice assistant mode activation command, to transmit the voice command from the microphone to the voice assistant application, and to transmit the graphical image response to a display.

15 Claims, 4 Drawing Sheets

(51) Int. Cl.
*G10L 15/22* (2006.01)
*G10L 15/28* (2013.01)
*G10L 17/04* (2013.01)

(56) References Cited

U.S. PATENT DOCUMENTS

| | | | |
|---|---|---|---|
| 8,116,823 B2 | 2/2012 | Seshadri et al. | |
| 9,472,206 B2 | 10/2016 | Ady | |
| 2011/0054900 A1* | 3/2011 | Phillips | G10L 15/30 |
| | | | 704/235 |
| 2014/0172432 A1* | 6/2014 | Sendai | G02C 11/10 |
| | | | 704/276 |
| 2014/0372126 A1* | 12/2014 | Ady | G06F 3/167 |
| | | | 704/270.1 |
| 2015/0302856 A1 | 10/2015 | Kim et al. | |
| 2015/0356603 A1 | 12/2015 | Tung et al. | |
| 2016/0044066 A1 | 2/2016 | Park et al. | |
| 2017/0118205 A1* | 4/2017 | Yang | H04W 12/068 |
| 2017/0199543 A1* | 7/2017 | Rhee | G10L 15/22 |
| 2018/0074785 A1* | 3/2018 | Ohmura | G06F 3/0487 |
| 2018/0308487 A1* | 10/2018 | Goel | G10L 15/26 |

\* cited by examiner

VOICE ASSISTANTS WITH GRAPHICAL IMAGE RESPONSES

BACKGROUND

Voice assistants are used on endpoint devices to help consumers with various activities. Voice assistants allow users to issue commands, queries, and the like with his or her voice to a device. For example, voice assistants can be deployed on mobile phones, laptop computers, desktop computers, tablet computers, automated home devices, and the like, to help users to be more productive and efficient.

Users can activate the voice assistant on a device and issue a voice command. The voice command is received and transmitted to a server in the cloud via the Internet. A response is generated and transmitted back to the device. The response is outputted through audio outputs, such as external speakers, on the device for the user to hear.

DETAILED DESCRIPTION

The present disclosure relates to voice assistants that generate graphical image responses. As discussed above, users can issue voice commands to voice assistants on an endpoint device to perform various functions and help the user with different activities. Currently, the voice assistants generate an audible response through the external speakers of the endpoint device that allow anyone in the area to hear the audible response of the voice assistant. This can create a security issue depending on what information is conveyed in the audible response by the voice assistant.

The graphical image response generated by the voice assistants in the present disclosure may provide a more secure interaction with the voice assistant compared to traditional audible responses provided by previous voice assistants. The graphical image response may be generated as part of a secure voice assistant mode that includes additional mechanisms that are discussed in further detail below.

Figure 1:
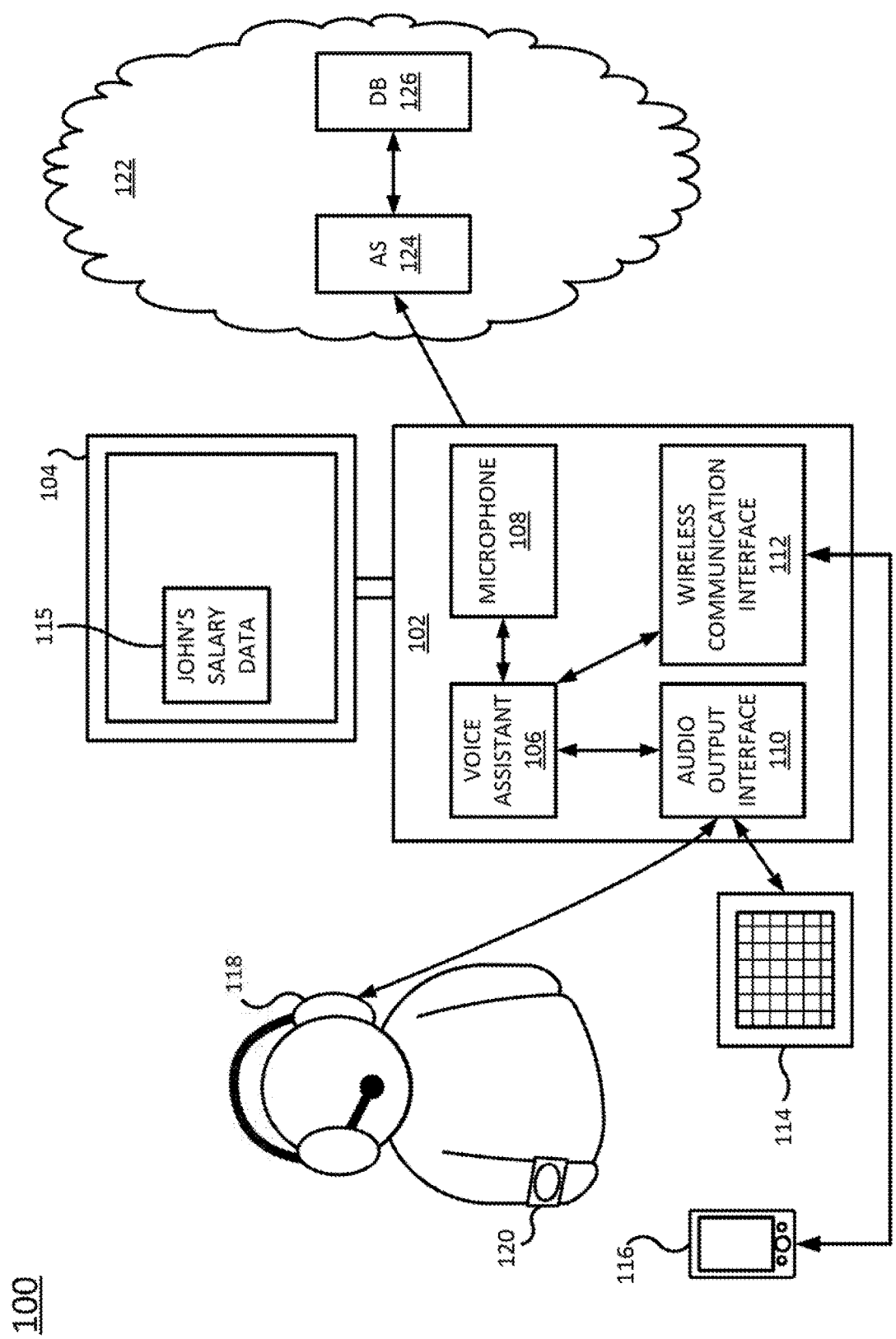
FIG. 1 is a block diagram of an example system of an electronic device having a voice assistant that generates a graphical image response of the present disclosure.

FIG. 1 illustrates a block diagram of a system 100 of the present disclosure. The system may include an electronic device 102 and a monitor 104. The electronic device 102 may be a desktop computer, a laptop computer, a tablet computer, a smartphone, and the like.

In one example, the electronic device 102 may include a voice assistant application 106, a microphone 108, an audio output interface 110, and a wireless communication interface 112. The audio output interface 110 may include more than one interface (e.g., an external speaker interface, a headphone audio output interface, and the like). The wireless communication interface 112 may also include more than one interface (e.g., a Wi-Fi interface, a Bluetooth® interface, and the like). It should be noted that the electronic device 102 has been simplified for ease of explanation and may include additional components not shown.

In one example, the voice assistant application 106 may receive voice commands from the microphone 108 that are provided by a user. For example, the microphone 108 may also be an interface that connects to a microphone on headphones 118 of a user. In one example, the voice command may be transmitted over a communication path to an application server 124 in an Internet protocol (IP) network 122. For example, the electronic device 102 may establish a wired or wireless communication path (e.g., via an Ethernet card (not shown), or the wireless communication interface 112) with the AS 124. The AS 124 may obtain information associated with the voice command from a database (DB) 126 and transmit the information back to the voice assistant application 106.

The voice assistant application 106 may transmit the audible response containing the information over the audio output interface 110 to an external speaker 114, or an internal speaker of the electronic device (not shown). However, as noted above, in certain environments an audible response may be undesirable.

In one example of the present disclosure, the voice assistant application 106 may generate a graphical image response 115 that can be shown on a display. Although a single graphical image response 115 is illustrated in FIG. 1, it should be noted that any number of graphical image responses 115 may be generated and displayed.

In one example, the display may be the monitor 104. In another example, the display may be a mobile endpoint device 116 (e.g., a smart phone, tablet computer, and the like) or a wearable device 120 (e.g., a smart watch that has a smaller screen that cannot be viewed by others). For example, a communication path may be established between the personal device 116 and the wearable device 120 via the wireless communication interface 112 to transmit the graphical image response 115.

In one example, the graphical image response 115 may include text, a still image, or a video. For example, the graphical image response 115 may display the audible response that is converted into a text form that can be read privately by the user. In another example, the graphical image response 115 may be a table, spreadsheet, or other document that is displayed to the user. In another example, the graphical image response 115 may be a video clip of a search request issued by the voice command. Thus, the present disclosure increases privacy and provides a more secure response by the voice assistant application 106 compared to audible responses that can be overhead by anyone.

In one example, the graphical image response 115 may be generated as part of a secure voice assistant mode. For example, the user may initiate the secure voice assistant mode by providing a secure voice assistant mode activation command. The command may be provided by issuing a voice command (such as "activate secure voice assistant mode"), toggling a physical switch or a button on the electronic device 102, selecting an option displayed on the monitor via a user interface (e.g., a keyboard or a touch screen), and the like. In response to activation of the secure voice assistant mode, the voice assistant application 106 may generate the graphical image response 115 instead of audible responses.

In one example, the secure voice assistant mode may include additional security configurations or change a privacy setting in the electronic device. For example, the voice assistant application 106 may detect audio output interfaces 110 that are connected to an external speaker 114 (e.g., non-headphone audio output interfaces) or wireless communication interfaces 112 that are connected to an external speaker 114 (e.g., wireless Bluetooth® speakers). The audio output interfaces 110 and the wireless communication interfaces 112 that are connected to an external speaker 114 (or any non-headphone audio outputs) may be temporarily disabled to prevent audible responses from being outputted to the external speaker 114. The voice assistant application 106 may also temporarily disable internal speakers. In addition, the voice assistant application 106 may temporarily disable other interfaces such as universal serial bus (USB) ports.

In one example, the voice assistant application 106 may also enable certain security features of the electronic device 102 or the monitor 104. For example, to prevent others from seeing the graphical image response 115, a privacy filter may be enabled on the monitor 104. In some examples, the electronic device may be deployed with a directional speaker.

The voice assistant application 106 may enable the directional speaker such that when audio is used (e.g., audio from a video) the audio is directed towards the user. In another example, the voice assistant application 106 may enable audio to the headphones 118. As a result, when audio is used the audio may be transmitted to the user via the headphones 118.

In one example, the secure voice assistant mode may enable local processing of voice commands. For example, voice commands may be prevented from being transmitted to the AS 124 over the IP network 122. For example, the electronic device 102 may have stored in memory known voice commands and pre-defined graphical image responses. For example, voice commands that are most commonly used may be stored in the memory of the electronic device and one of the pre-defined graphical image responses may be provided. When a voice command is issued, the voice command may be processed locally by the voice assistant application 106 without transmitting the voice command to the IP network 122. When the voice command is processed locally, the graphical image response 115 may include text, documents, video, still images, and the like, or one of the pre-defined graphical image responses that are stored locally in the electronic device 102, In one example, the known voice commands that are stored in memory may be customized by the user. For example, for an enterprise setting, certain voice commands specific to the enterprise may be commonly used. These voice commands may be added to the known voice commands for local processing when the secure voice assistant mode is activated.

In one example, the secure voice assistant mode may enable a 1-to-1 communication standard with persistent authentication. In other words, a single authorized user may be allowed to issue voice commands to the voice assistant application 106. The single authorized user may be authenticated based on voice identification. For example, the authorized user may store a voice profile on the electronic device 102 that measures a parameter of the user's voice. The parameter may include tones, inflections, accents, and the like, that are unique to the voice of the user. The persistent authentication may include, for each time a voice command is issued, comparing a parameter of the voice command that is captured by the microphone 108 to the stored a parameter of the voice profile. When the voice command is authenticated as being a match to the stored voice profile of the single authorized user, the voice command may be executed by the voice assistant application 106. Thus, in addition to generating the graphical image response 115, the voice assistant application 106 may initiate several additional privacy configuration settings on the electronic device 102 when the secure voice assistant mode is activated.

Figure 2:
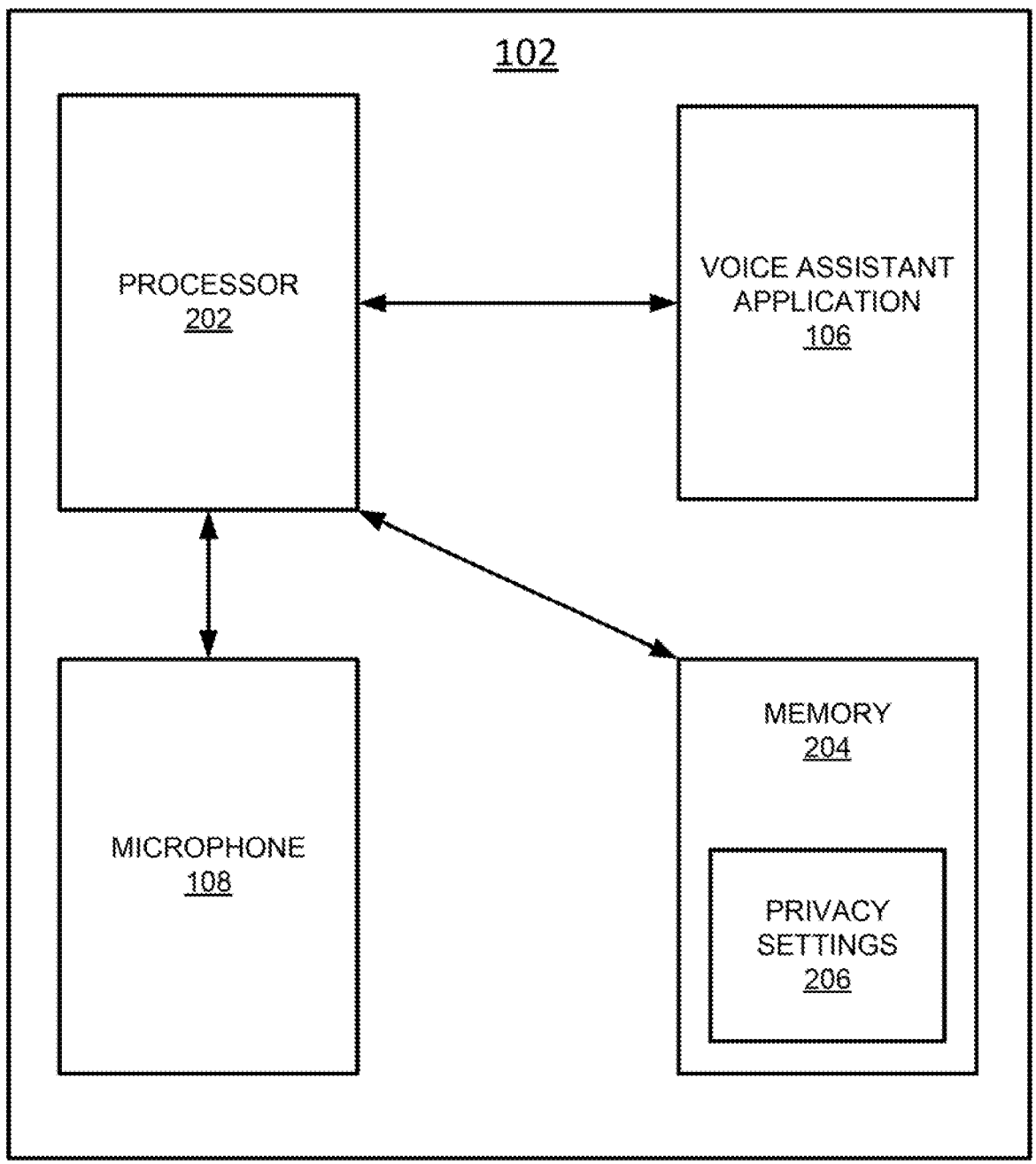
FIG. 2 is a block diagram of an example electronic device with a voice assistant that generates a graphical image response of the present disclosure.

FIG. 2 illustrates a block diagram of the electronic device 102. In one example, the electronic device 102 may include a processor 202 that is communication with the voice assistant application 106, the microphone 108 and a memory 204. In one example, the microphone 108 may receive a secure voice assistant mode activation command a voice command from the user. The voice assistant mode activation command may be forwarded from the microphone 108 to the voice assistant application 106 by the processor 202.

The processor 202 may execute the voice assistant application 106 to change a privacy setting 206 stored in the memory 204 in response to the voice assistant mode activation command. The privacy settings 206 may include changing responses from the voice assistant application 106 from audible response to the graphical image responses 115. The privacy settings 206 may also include configuration changes and activating certain security features, as described above. For example, a communication path may be established between the electronic device 102 and the mobile endpoint device 116 or the wearable device 120 and the graphical image response 115 may be transmitted for display on the mobile endpoint device 116 or the wearable device 120. Non-headphone audio output interfaces, either wired or wireless, may be disabled, while headphone audio output interfaces are enabled. Audible responses (when necessary), or audio associated with the graphical image response 115 may be transmitted to the headphones 118 over a channel established by the headphone audio output interface (e.g., an interface on the audio output interface 110) to the headphones 118.

In other examples, a privacy filter may be activated on the monitor 104. In one example, the voice commands may be processed locally by the processor 202 of the electronic device 102. In other words, the voice commands may not be transmitted over an IP network 122 to the AS 124. Processing voice commands local may provide increased security and prevent voice commands and responses from being intercepted by others on the same IP network 122. The memory 204 may store known voice commands for local processing of voice commands, as described above. In another example, a 1-to-1 communication standard with persistent authentication may be enabled.

After the secure voice assistant mode is activated, the voice assistant application 106 may generate the graphical image response 115 in response to the voice command. The processor 202 may transmit the graphical image response 115 to a display. For example, the graphical image response 115 may be transmitted to a graphics processor of the display and the graphics processor may modify the graphical image response 115 for the display. As noted above, the display may be the monitor 104 associated with the electronic device 102, or may be a smaller, more private display, associated with the mobile endpoint device 116 or the wearable device 120. Thus, the graphics processor may be associated with the monitor 104, be part of the electronic device 102, be part of the mobile endpoint device 116, or be part of the wearable device 120 and modify the graphical image response 115 to display correctly on the respective display.

Figure 3:
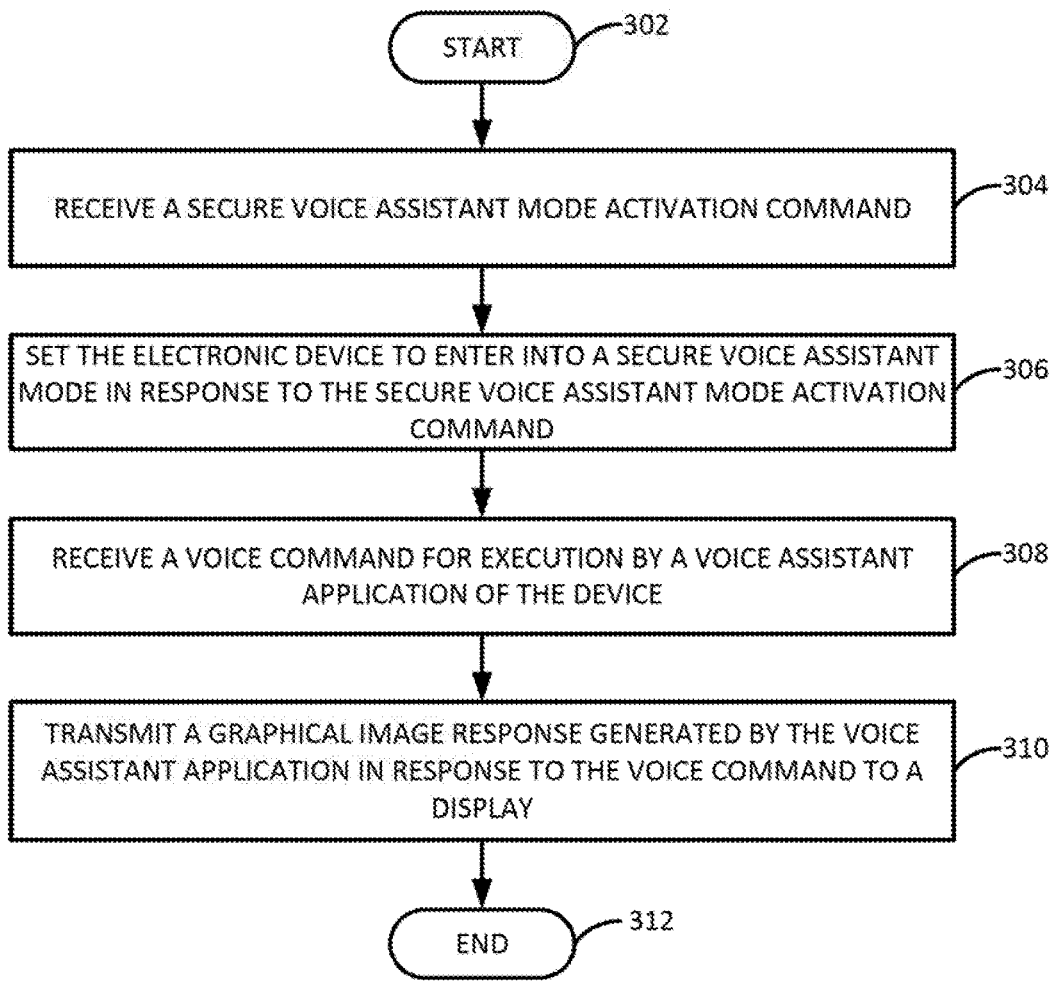
FIG. 3 is a flow chart of an example method for generating a graphical image response by a voice assistant application of the present disclosure.

FIG. 3 illustrates a flow diagram of an example method 300 for generating a graphical image response by a voice assistant application. In one example, the method 300 may be performed by the electronic device 102 or an apparatus 400 described below and illustrated in FIG. 4.

At block 302, the method 300 begins. At block 304, the method 300 receives a secure voice assistant mode activation command. For example, the user may state the wake command to activate the voice assistant application and then issue a command such as "activate secure voice assistant mode."

At block 306, the method 300 sets the electronic device to enter into a secure voice assistant mode in response to the secure voice assistant mode activation command. For example, the secure voice assistant mode may include converting audible response of the voice assistant application into graphical image responses. The secure voice assistant mode may also include changing privacy settings. Changing privacy settings may include activating certain non-headphone audio output interfaces, enabling security features such as a privacy filter on a monitor of the electronic device, enabling local processing of voice commands, enabling a 1-to-1 communication standard with persistent authentication, and the like.

At block 308, the method 300 receives a voice command for execution by a voice assistant application of the electronic device. For example, after the secure voice assistant mode is enabled, the user may issue a voice a command such as "what are the salaries of employees in the engineering department?" The user may have enabled the secure voice assistant mode due to the sensitive nature of the information that may be returned from the voice command.

At block 310, the method 300 transmits a graphical image response generated by the voice assistant application in response to the voice command to a display. The display may be the monitor of the electronic device, a mobile endpoint device of the user, a wearable device, and the like, as described above.

Using the example voice command in block 308, the graphical image response may include a table or electronic spreadsheet that include the salaries, a text message that is displayed that conveys the salary information to the user, a picture of a document that includes the salary information, and the like.

The voice command may have been processed locally and the graphical image response may contain information that was obtained from memory of the electronic device, or a secure local connection to a local server within an enterprise location. In other words, when the secure voice assistant mode is activated, the voice command may be processed without transmitted the voice command or information over the Internet or any other external IP network.

Other security features may be deployed when processing the voice command or displaying the graphical image response, as described above. For example, voice authentication may be used to authenticate the voice command before execution, a privacy filter may be activated on the monitor of the electronic device before displaying the graphical image response on the monitor, and the like. At block 312, the method 300 ends.

Figure 4:
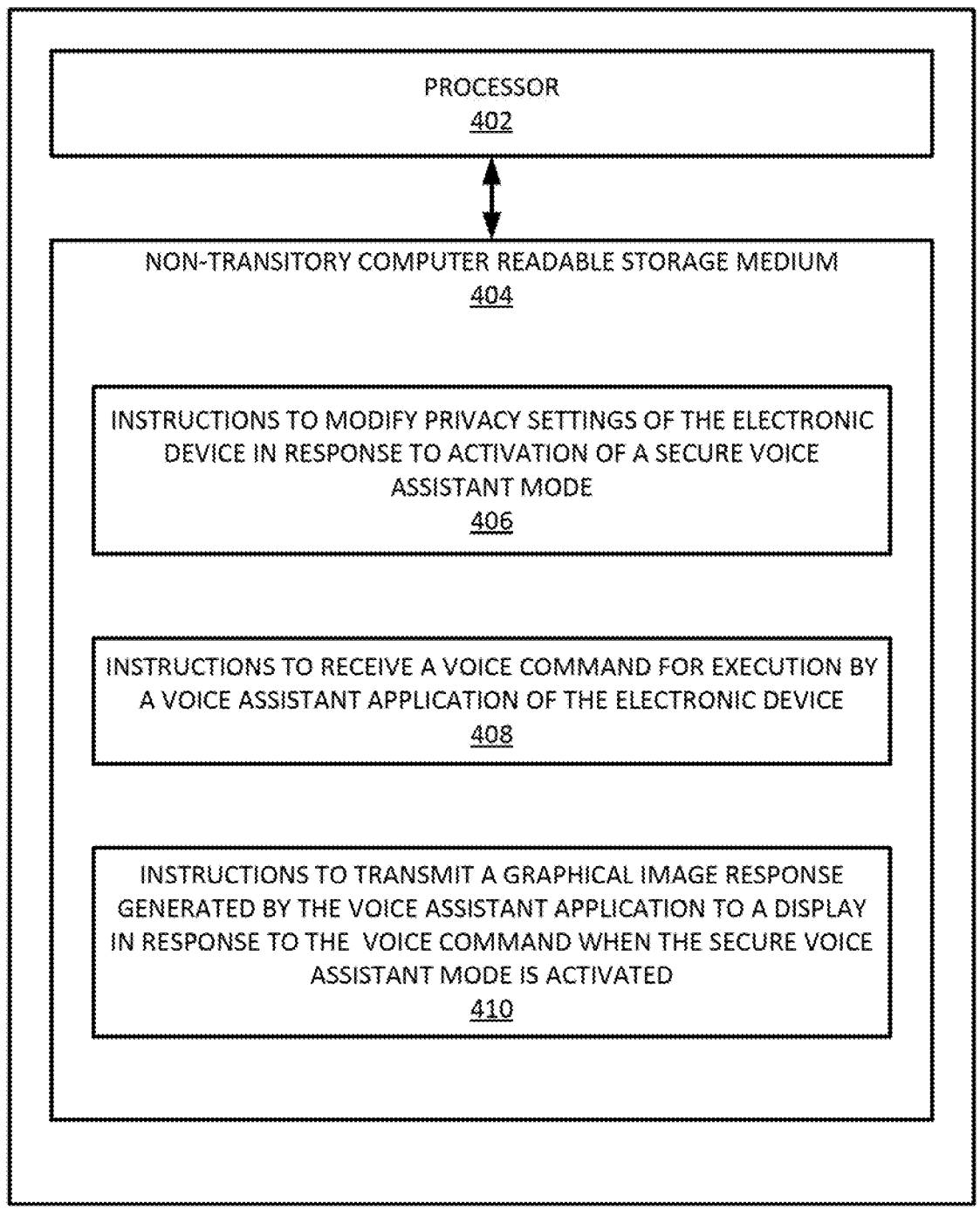
FIG. 4 is a block diagram of an example non-transitory computer readable medium storing instructions executed by a processor of the present disclosure.

FIG. 4 illustrates an example of an apparatus 400. In one example, the apparatus 400 may be the electronic device 102. In one example, the apparatus 400 may include a processor 402 and a non-transitory computer readable storage medium 404. The non-transitory computer readable storage medium 404 may include instructions 406, 408 and 410 that when executed by the processor 402, cause the processor 402 to perform various functions.

In one example, the instructions 406 may include instructions to modify privacy settings of the electronic device in response to activation of a secure voice assistant mode. The instructions 408 may include instructions to receive a voice command for execution by a voice assistant application of the electronic device. The instructions 410 may include instructions to transmit a graphical image response generated by the voice assistant application to a display in response to the voice command when the secure voice assistant mode is activated.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a microphone to receive a secure voice assistant mode activation command and a voice command, wherein the voice command comprises a query for information; and
a processor in communication with the microphone, wherein the processor is to:
execute a voice assistant application, wherein the voice assistant application is to generate a graphical image response in response to the secure voice assistant mode activation command and the voice command,
change a privacy setting in the apparatus in response to the secure voice assistant mode activation command,
transmit the voice command from the microphone to the voice assistant application,
convert an audible response to the voice command into the graphical image response, and
transmit the graphical image response to a display.

2. The apparatus of claim 1, wherein the display is part of the apparatus.

3. The apparatus of claim 1, further comprising:
a communication interface to establish a communication path with a personal device, wherein the display is associated with the personal device and the graphical image response is transmitted over the communication path to the personal device to be shown on the display of the personal device.

4. The apparatus of claim 3, wherein the personal device comprises a mobile endpoint device or a wearable device.

5. The apparatus of claim 1, further comprising:
a headphone audio output interface; and
a non-headphone audio output interface associated with non-headphone audio outputs, wherein the processor, in response to the secure voice assistant mode activation command, is to disable the non-audio headphone audio output interface and transmit an audible response generated by the voice assistant application via a channel established by the headphone audio output interface.

6. The apparatus of claim 1, wherein the voice assistant application is to process the voice command locally on the apparatus via the processor.

7. The apparatus of claim 1, wherein the graphical image response comprises text, a still image, or a video.

8. A method, comprising:
receiving, by a processor of an electronic device, a secure voice assistant mode activation command;

setting, by the processor, the electronic device to enter into a secure voice assistant mode in response to the secure voice assistant mode activation command;

receiving, by the processor, a voice command for execution by a voice assistant application of the device, wherein the voice command comprises a query for information;

converting, by the processor, an audible response to the voice command into a graphical image response; and transmitting, by the processor, the graphical image response generated by the voice assistant application in response to the voice command to a display.

9. The method of claim 8, wherein the transmitting comprises transmitting the graphical image response to a graphics processor of the device to be displayed on the display, and wherein the display is part of the device.

10. The method of claim 8, wherein the setting comprises establishing a communication path to a personal device, wherein the display is associated with the personal device, wherein the transmitting comprises transmitting the graphical image response over the communication to the personal device to be displayed on the display, and wherein the display is part of the personal device.

11. The method of claim 8, comprising:
storing, by the processor, a voice profile of an authorized user;
comparing, by the processor, a parameter of the voice command to the voice profile; and
transmitting, by the processor, the voice command to the voice assistant when the parameter of the voice command matches the voice profile.

12. The method of claim 8, wherein the secure voice assistant mode activation command is received via a voice command, a physical switch, or a user interface.

13. A non-transitory computer readable storage medium encoded with instructions executable by a processor of an electronic device, the non-transitory computer-readable storage medium comprising:

instructions to modify privacy settings of the electronic device in response to activation of a secure voice assistant mode;

instructions to receive a voice command for execution by a voice assistant application of the electronic device, wherein the voice command comprises a query for information;

instructions to convert an audible response to the voice command into a graphical image response; and instructions to transmit the graphical image response generated by the voice assistant application to a display in response to the voice command when the secure voice assistant mode is activated.

14. The non-transitory computer readable storage medium of claim 13, comprising:
instructions to generate the graphical image response by the voice assistant application of the device locally via pre-defined graphical image responses stored in the non-transitory computer-readable storage medium.

15. The non-transitory computer readable storage medium of claim 13, wherein the graphical image response comprises a text, a still image or a video.

* * * * *